US006172708B1

(12) United States Patent
Palmer (10) Patent No.: US 6,172,708 B1
(45) Date of Patent: Jan. 9, 2001

(54) MODULAR NIGHT VISION DEVICE AND POWER SUPPLY FOR A TELEVISION CAMERA

(75) Inventor: Gary L. Palmer, Vinton, VA (US)

(73) Assignee: ITT Manufacturing Enterprises, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/801,569

(22) Filed: Feb. 18, 1997

(51) Int. Cl.[7] .................................................. H04N 2/225
(52) U.S. Cl. .......................................... 348/217; 348/372
(58) Field of Search ................................... 348/372, 216, 348/217, 335, 376, 375, 371

(56) References Cited

U.S. PATENT DOCUMENTS

| 3,553,363 | * | 1/1971 | Anderson | 348/217 |
| 3,851,206 | * | 11/1974 | Hansen | 315/30 |
| 4,254,437 | * | 3/1981 | Funk et al. | 348/217 |
| 5,179,445 | * | 1/1993 | Hadfield | 348/372 |
| 5,444,507 | * | 8/1995 | Palmer | 396/421 |
| 5,537,261 | * | 7/1996 | Palmer | 348/373 |
| 5,564,817 | * | 10/1996 | Palmer | 362/191 |
| 5,717,460 | * | 2/1998 | Tsuruta et al. | 348/371 |
| 5,745,170 | * | 4/1998 | Palmer | 348/217 |
| 5,959,668 | * | 9/1999 | Cryder et al. | 348/229 |

* cited by examiner

Primary Examiner—Wendy Garber
Assistant Examiner—Jacqueline Wilson
(74) Attorney, Agent, or Firm—Pollock, Vande Sande & Amernick, R.L.L.P.

(57) ABSTRACT

A modular night vision device for universal use with various types of camera devices. The night vision device has an image intensifier module for intensifying light images which can be removably coupled to a lens mount aperture of a camera device, and a separate power supply control module which can be removably coupled to a remotely located surface of the camera device and electrically coupled to an externally-located power jack of the camera device. The power supply control module is provided for receiving any DC voltage produced by the camera device which falls within a predetermined range of DC voltages and converting the voltage into a plurality of operating voltages which are useable to power the image intensifier module. The night vision device also has a cable for transmitting the operating voltages from the power supply control module to the image intensifier module.

2 Claims, 6 Drawing Sheets

MODULAR NIGHT VISION DEVICE AND POWER SUPPLY FOR A TELEVISION CAMERA

FIELD OF THE INVENTION

The present invention relates to night vision imaging devices and more specifically, to a universal night vision imaging device which can be used with various camera devices such as television cameras and the like.

BACKGROUND OF THE INVENTION

The prior art includes many night vision imaging devices that enhance or enable a person to view objects at night or in other low light conditions. A night vision imaging device typically consists of an image intensifier tube and various electronic components which are used to control the image produced by the device. Many of these night vision imaging devices are stand-alone units with objective lens assemblies for receiving images and ocular lens assemblies through which a person can directly view light-intensified images. The objective lens assemblies of such night vision imaging devices are configured to be focusable and/or are provided with a focusable ocular lens assembly, so that a person can adjust the device to meet his/her needs. Furthermore, it is very common for such night vision imaging devices to be provided with some degree of magnification power.

There are many applications, such as night time photography and night time surveillance, where it is desirable to provide a camera device such as a television camera or the like, with night vision imaging capabilities. One method of accomplishing this is to couple a night vision imaging device to the camera device just in front of the camera's objective lens assembly via a filter screw mount provided on either the body of the camera device or on the objective lens assembly itself. This requires that the objective lens assembly of the camera device be focussed on the output of the night vision device, consequently, the camera must rely solely on the optics of the night vision device for focussing and zooming.

Another method of providing a camera device with night vision imaging capabilities involves camera devices with removable objective lens assemblies, wherein the objective lens assembly is removed and the night vision imaging device is coupled directly to the lens mount provided in the body of the camera device. Again like in the previous method, the camera device must rely solely on the optics of the night vision device for focussing and zooming.

Another problem common to both methods concerns the weight of the night vision imaging device. Each night vision imaging device described above typically includes an image intensifier tube, an objective lens assembly, a focussing lens assembly, a battery source and a power supply control unit which includes means for converting an input voltage received from the battery source into a set of voltages required to power various stages of the image intensifier tube. Such night vision imaging devices add considerably to the overall weight and length of the camera device which makes it less desirable to use and operate, especially since the additional weight and length is all concentrated at the far end of the camera device. The weight of the night vision imaging device is also a factor in the longevity of the threaded mounts to which the night vision device is attached to. These lens and filter mounts have thread configurations which tend to be rather delicate. Thus, achieving a substantial reduction in the weight of the night vision device by eliminating the battery source can yield significant increases in the longevity of the threaded mounts and ease of operability of the camera device.

One solution to the weight problem described above, is to eliminate the night vision device's battery source and obtain power from a remote source such as a television camera to which the night vision device is attached. Many television camera have externally-located power jacks which enable the camera to supply power to auxiliary electronic components such as lights. Thus, it would seem that by coupling the power supply control unit of the night vision device to the power jack of the camera, the night vision device could be properly operated. However, the voltage and current generally available from these external power jacks are not directly usable by the image intensifier tube of the night vision device without making modifications to the power supply control unit. Moreover, the voltage and current available from these external power jacks vary from camera device to camera device, depending upon what type of auxiliary device the jacks were originally intended to provide power for.

A need therefore, exists for an improved universal night vision imaging device for different types of camera devices, which enables the camera devices to rely on their own optics for focusing and zooming. There is a further need for a night vision device having a substantially reduced weight and length when compared to similar prior art night vision devices, which can be powered by the externally-located power jacks of various types of camera devices.

SUMMARY

The present invention is directed to a modular night vision device for universal use with various types of camera devices. The night vision device comprises an image intensifier module for intensifying light images which can be removably coupled to a lens mount aperture of a camera device, and a power supply control module which can be removably coupled to a remotely located surface of the camera device and electrically coupled to an externally-located power jack of the camera device. The power supply control module is provided for receiving any DC voltage produced by the camera device which falls within a predetermined range of DC voltages and converting the voltage into a plurality of operating voltages which are useable to power the image intensifier module. The night vision device also comprises a cable for transmitting the operating voltages from the power supply control module to the image intensifier module.

Another aspect of the present invention is directed to a lens mount means disposed on an input end of the image intensifier module, for receiving an objective lens assembly.

Still another aspect of the present invention is directed to the objective lens assembly mentioned above which comprises an original component of the camera device.

A further aspect of the present invention is directed to an image intensifier tube and a collimator, both housed in the image intensifier module.

Still a further aspect of the present invention is directed to a focusing lens attached to an output end of the image intensifier module, for focusing an output of the image intensifier module onto image receiving means housed within the camera device.

Still another aspect of the present invention is directed to input filter means for receiving the range of DC voltages which is housed with the power supply control module.

Another aspect of the present invention is directed to the power supply control module which further houses voltage regulator means and a high voltage supply means, the voltage regulator means coupled between the input filter means described above and the high voltage supply means. The input filter means, in response to any received voltage within the range of DC voltages, producing a constant output voltage at the voltage regulator means which is applied to the high voltage supply means, thereby causing the high voltage supply means to generate the operating voltages. The voltage regulator means also produces a voltage for energizing light emitting diode means which provides illumination at night for the night vision device.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

The night vision imaging device of the present invention is principally intended for providing night vision imaging capabilities to various types of camera devices, such as television cameras and video camcorders, which have externally-mounted, removable objective lens assemblies and externally-located power jacks for powering auxiallery electronic devices such as lights, light meters and the like. Thus, the night vision imaging device of the present invention will be described in conjunction with such camera devices. It should be understood, however, that the night vision imaging device can also be used to provide night imaging capabilities to other types of optical devices which have externally-mounted, removable objective lens assemblies and externally-located powerjacks.

Figure 1A:
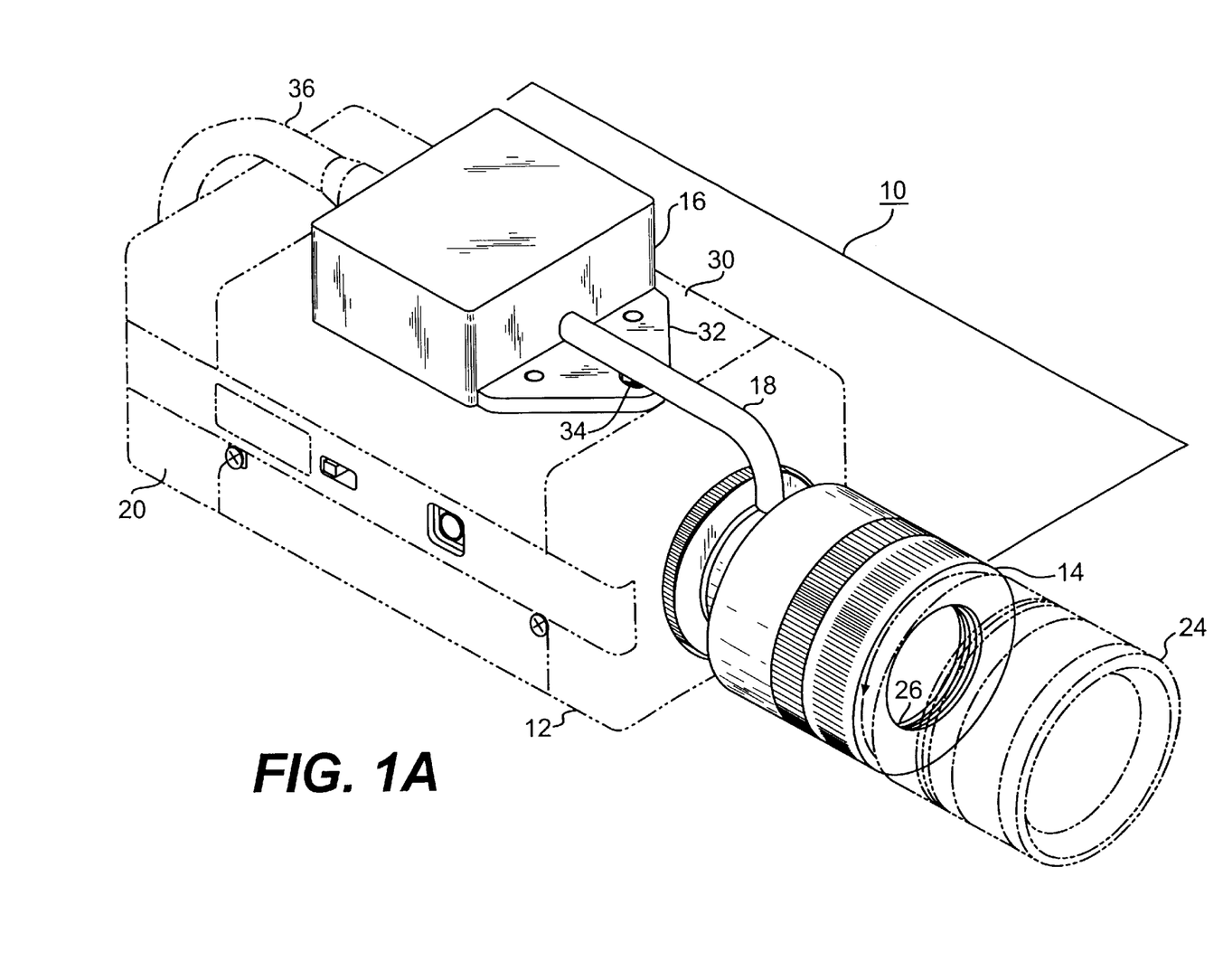
FIGS. 1A and 1B are front and rear perspective views of an embodiment of the modular night vision device of the present invention shown coupled to a camera device.
Figure 1B:
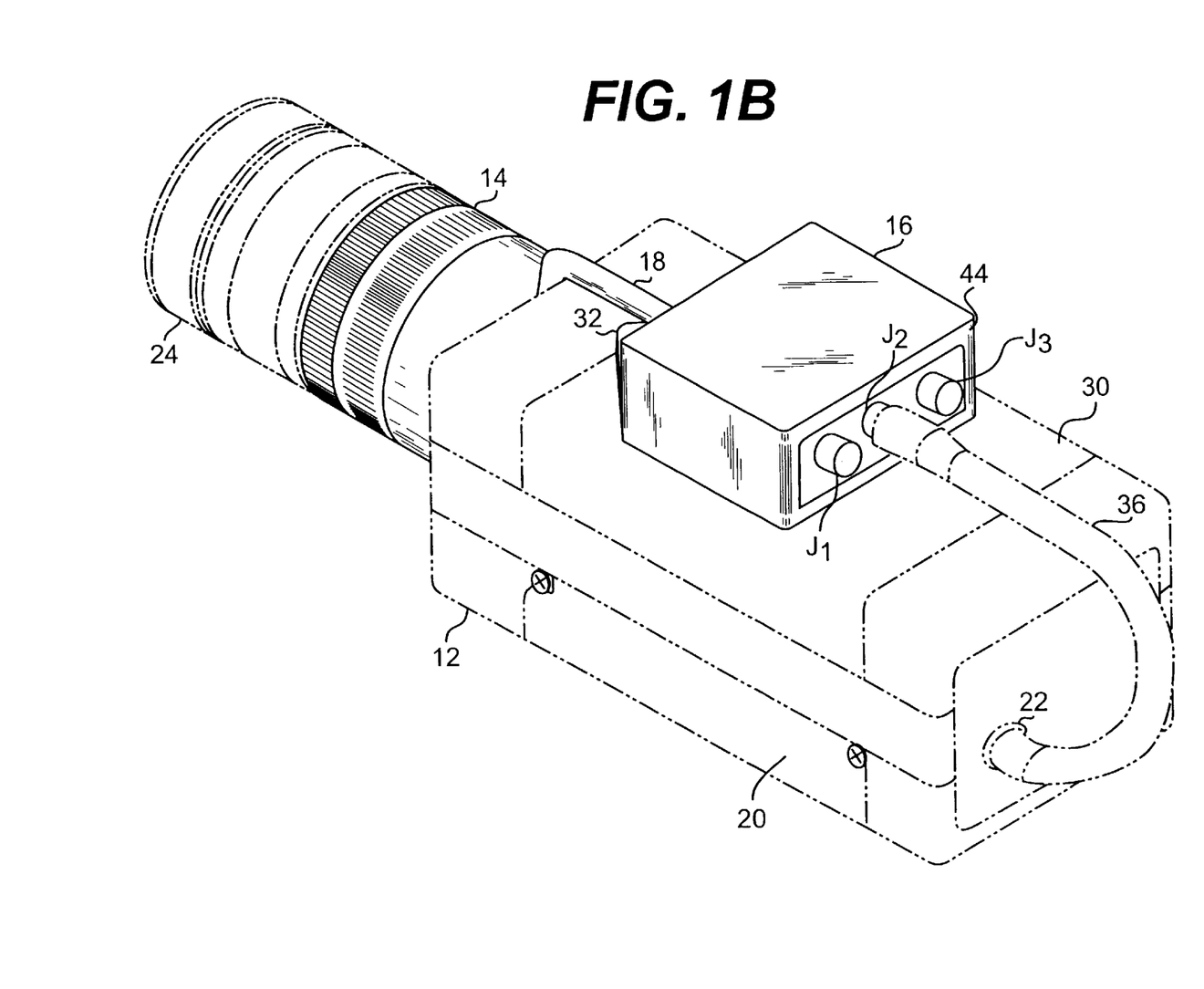

Referring to the embodiment of FIGS. 1A and 1B, the night vision imaging device 10 of the present invention is shown coupled to a commercially available television camera 12 (broken lines). The night vision imaging device 10 generally comprises two separate modules: an image intensifier module 14 and a power supply control module 16. A cable 18 extending between the two modules, electrically couples the modules together. This arrangement allows the use of a more sophisticated power supply control module that enables the night vision device to be universally used with many different types of television cameras and like devices. Furthermore, configuring the night vision device into two separate modules allows the weight of the night vision device to be more evenly distributed on the camera and decreases the overall length of the night vision device and camera assembly.

The camera consists of a camera body 20 having an externally-located power jack 22 and preferably, an internally threaded lens mount aperture (not visible) that receives an externally-mounted, removable objective lens assembly 24. The part of the camera device or combined camera/image intensifier apparatus in front of the lens mount aperture may be referred to as the front end. As can be seen, the image intensifier module 14 replaces the objective lens assembly 24 and is removably coupled to the camera body 20 via the internally threaded lens mount aperture. The objective lens assembly 24 is then removably coupled to an internally threaded lens mount aperture 26 provided at an input end of the image intensifier module 14. Accordingly, the camera 12 relies on the optical capabilities of its own objective lens assembly 24 and thus, the image intensifier module 14 does not require its own objective lens assembly. Moreover, the weight and length of the overall camera/night vision assembly is substantially reduced since, only one objective lens assembly is used in the overall assembly.

The power supply control module 16 is detachably mounted on a surface of the camera body 20, and preferably on a top surface 30 as shown. This is accomplished by providing the power supply control module 16 with a mounting flange 32 which defines an aperture 34 for thumb screw mounting of the power supply control module 16 to the camera 12 when the camera body 20 is provided with a thumb screw receiving aperture (not shown) for mounting auxiliary devices to the camera 12. Detachable mounting of the power supply control module 16 can also be accomplished using any well known hook and loop fastener means adhesively attached to both the surface 30 of the camera body 20 and a surface of the power supply control module 16. Power from the camera 12 is transmitted to the power supply control module 16 through a power cable 36 which detachably couples to one of two power input jacks J2, J3 of the power supply control module 16 at an input end 44, and detachably couples to the externally-located power jack 22 of the camera 12.

Figure 2A:
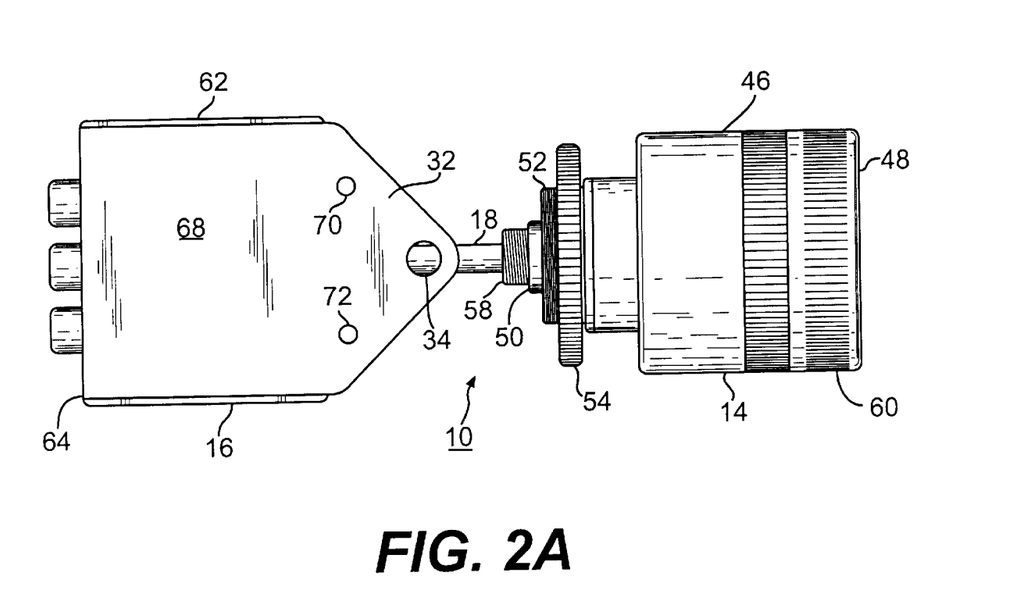
FIG. 2A is a bottom plan view of the modular night vision device of FIGS. 1A and 1B shown separate from the camera device.
Figure 2B:
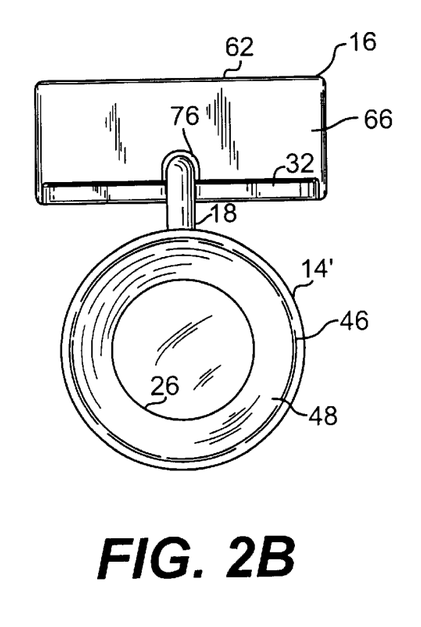
FIG. 2B is a front elevational view of the modular night vision device of FIG. 2A.
Figure 2C:
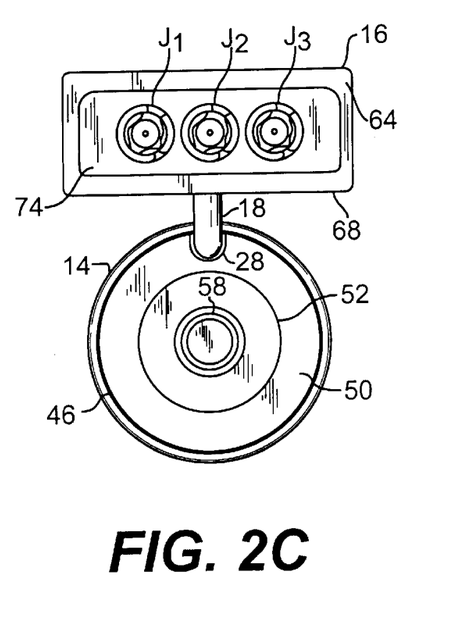
FIG. 2C is a front elevational view of the modular night vision device of FIG. 2A.

Referring to FIGS. 2A–2C, the night vision device 10 of FIGS. 1A and 1B is shown separated from the camera 12 so that the external structure of the image intensifier module 14 and power supply control module 16 can be described. As can seen, the image intensifier module 14 is encased in a cylindrical housing 46 having an input end 48 and output end 50. The output end 50 of the housing 46 steps down in diameter to an externally threaded cylindrical member 52 which is adapted to thread into the internally threaded lens mount of the camera 12. An internally threaded locking ring 54 is provided on the cylindrical member 52 and is threaded up against the camera body 20 (as shown in FIG. 1A) after the image intensifier module 14 is coupled to the camera 12 to prevent the cylindrical member 52 from unthreading from the lens mount. The cylindrical member 52 includes an internally threaded aperture 56 (visible in FIG. 3) which receives an externally threaded focussing lens 58 that focusses the output of the image intensifier module 14 at image receiving means (not shown) in the camera body 12. The input end 48 of the image intensifier module housing 46 includes an internally threaded removable cap 60 which threads to an external threaded arrangement 61 disposed on the input end 48 of the housing 46 (visible in FIG. 3). As shown in FIG. 2B, the cap 60 includes the threaded lens mount aperture 26 described above that receives the objective lens assembly 24 of the camera 12. The output end 50 of the image intensifier module housing 46 best seen in FIG.

2C, includes an aperture 28 which enables the cable 18 which electrically couples the image intensifier module 14 to the power supply control module 16 to pass through the image intensifier module housing 46. The cable 18 includes conductors (not shown) which electrically couple the internal components of the image intensifier module to the power supply control module.

Referring still to FIGS. 2A–2C, the power supply control module 16 is encased in a housing 62 which has a generally rectangular or square shape and defines an input end 64 and an output end 66. The housing 62 is sealed by a planar cover 68 which includes the mounting flange 32 that defines the aperture 34 for thumb screw mounting as describe earlier. The mounting flange 32 also defines two additional apertures 70, 72 which are used for receiving dowel pins that may be also provided on the camera body surface. Such dowel pins would be used in conjunction with the thumb screw for preventing the power supply control module 16 from rotating about the thumb screw. The input end 64 of the power control supply module housing 62 best seen in FIG. 2C, includes a jack plate 74 with the two earlier mentioned input jacks J2, J3 and an output jack J1, the purpose of which will be described further on. The output end 66 of the power supply control module housing 62 best seen in FIG. 2B, includes an aperture 76 which enables the cable 18, which electrically couples the image intensifier module 14 to the power supply control module 16 to pass through the power supply control module housing 62 similar to the aperture 28 defined in the output end 50 of the image intensifier module housing 46.

Figure 3:
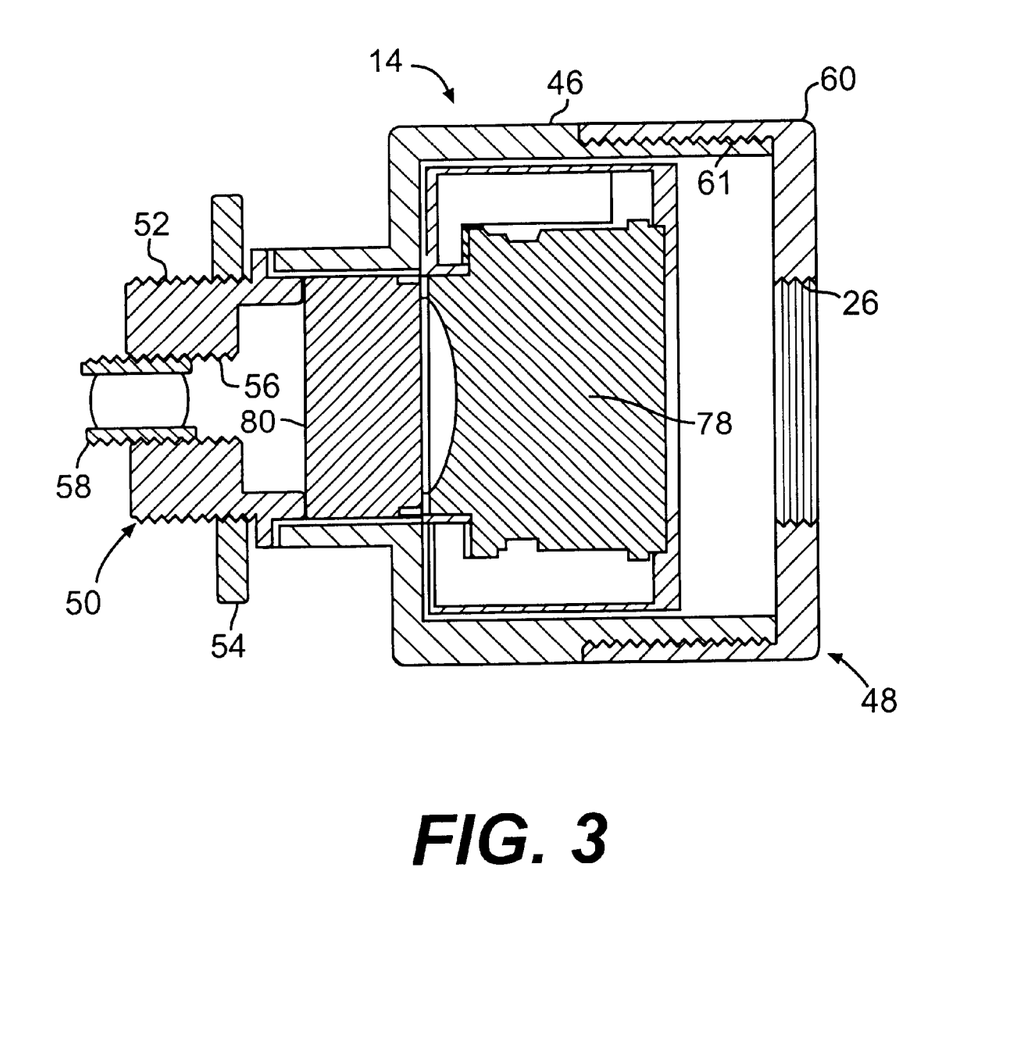
FIG. 3 is a cross-sectional side view of the image intensifier module.

Referring to FIG. 3, a cross-sectional side view of the image intensifier module 14 is shown. The housing of the image intensifier module 46 contains an image intensifier 78 and a collimator 80. Such image intensifiers are well known in the art, see for example, U.S. Pat. No. 05,077,611 to Phillips et al., entitled UNIVERSAL IMAGE INTENSIFIER TUBE; U.S. Pat. No. 5,336,881 to Caserta et al., entitled HIGH RESOLUTION CONTROL OF AN IMAGE INTENSIFIER TUBE, which are incorporated herein by reference to show in detail, the structure and function of the image intensifier tube used in the image intensifier module of the present invention. As described in these patents, image intensifiers used in night vision devices typically comprise a photocathode, a microchannel plate and an anode. The photocathode is generally a photoemissive wafer that is extremely sensitive to low-radiation levels of light in the 580–900 nm spectral range. The photoemissive wafer provides an emission of electrons in response to the radiation of the light. The emitted electrons impinge an input of the microchannel plate which operates as an electron multiplier to increase the brightness of the image that will be generated by the anode. The microchannel plate is a thin glass plate having an array of microscopic holes through it. The microhannel plate increases the density of the electron emission since each electron impinging on the microchannel plate results in the emission of a number of secondary electrons which in turn, causes the emission of more secondary electrons. All the electrons emitted from the microchannel plate are accelerated towards the anode which is a phosphor screen that is maintained at a higher positive potential than the photocathode. The phosphor screen converts the electron emission into visible light. The image intensifier 78 used in the image intensifier module 14 of the present invention can be either a well known Gen II or Gen III image intensifier tube.

The collimator 80 depicted in FIG. 3 typically contains a plurality of lens elements provided for collimating the image produced by the image intensifier 78. Such collimators are also well known in the art. For example, see U.S. Pat. No. 5,157,553 to Phillips et al., entitled COLLIMATOR FOR A BINOCULAR VIEWING SYSTEM which is incorporated herein by reference to show the structure and function of the collimator used in the image intensifier module of the present invention.

Figure 4A:
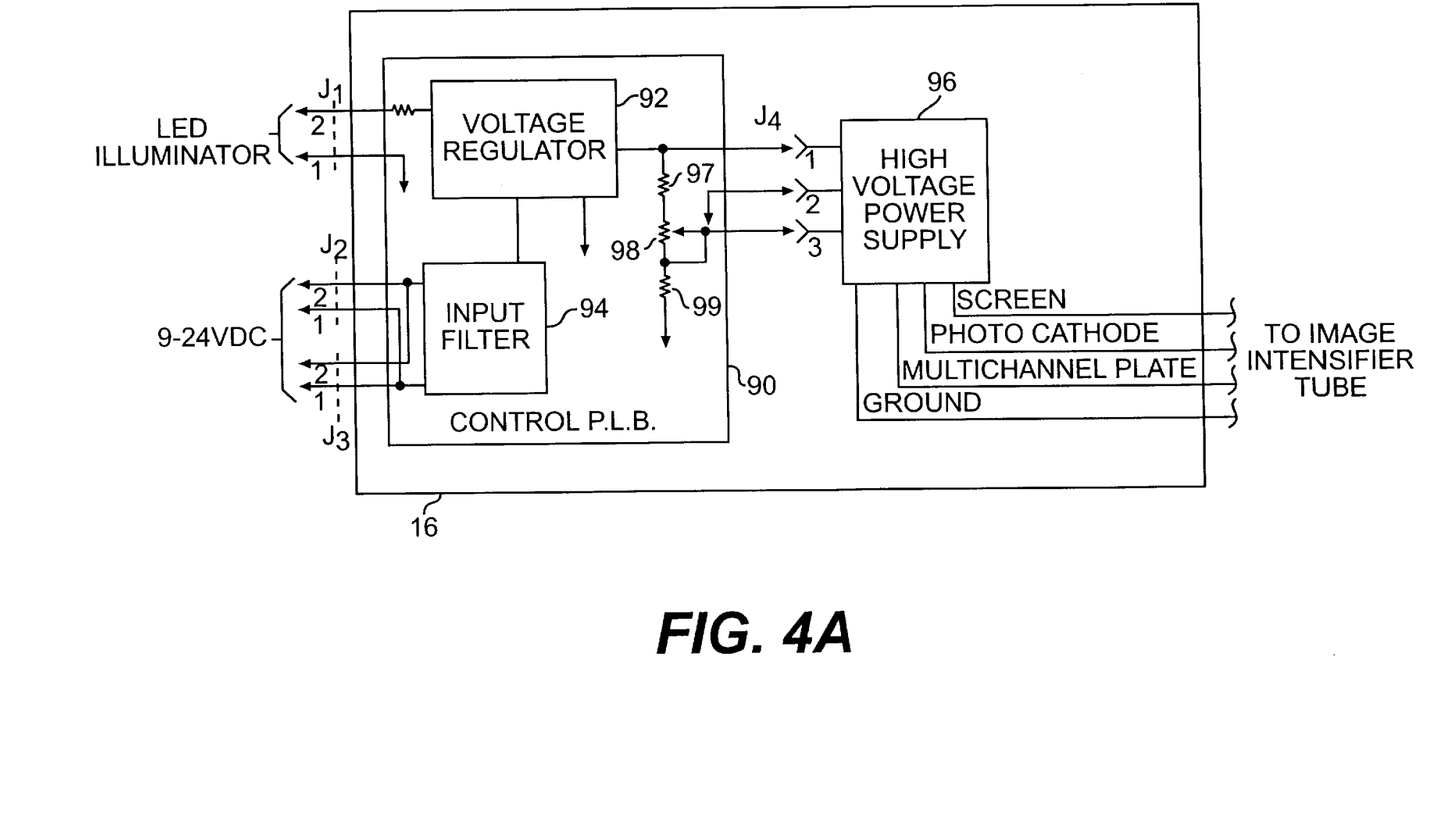
FIG. 4A is a block diagram of the power control supply module.

Referring to FIG. 4A, there is shown a block diagram of the power supply control module 16. Essentially, the power supply control module 16 consists of a voltage regulator 92 which is coupled to an input filter 94. The output of the voltage regulator 92 is coupled to an input of a high voltage power supply 96. The output of the voltage regulator 92 is coupled to a point of reference potential through a resistor chain consisting of a first resistor 97, a potentiometer 98, and a second resistor 99. A variable voltage is applied to terminal 3 of the high voltage power supply with terminal 2 of the high voltage power supply 96 being at reference potential and terminal 1, also designated as J4, receiving the output of the voltage regulator.

The high voltage supply 96 is well known and many examples of high voltage supplies for image intensifiers exist in the prior art. The high voltage supply is capable of generating high voltages for the anode (screen electrode), the photocathode, and the microchannel plate or MCP of the image intensifier tube. Such high voltage supplies normally contain an oscillator which may be coupled to a transformer to step the voltage up and then employs a series of voltage multipliers such as diode and capacitor arrangements to develop high potential at relatively low current. The high voltage supply for image intensifiers is quite well known.

The input filter 94, as will be further explained, is coupled to input jacks designated as J2 and J3. Each jack has two terminals designated as 1 and 2. Therefore, J2 has terminals 1 and 2, J3 has terminals 1 and 2. There is also shown jack JI having terminals 1 and 2 which essentially provides a voltage from the output of the voltage regulator 92 which can energize or power an LED or light emitting diode device to provide illumination at night for the night vision apparatus. As is well known, image intensifiers have an increased output for the red spectrum. Therefore, an LED, which may be a non-visible illuminator, can illuminate a target in complete darkness to enable the output from the image intensifier to be greatly enhanced.

The input filter operates so that it can receive any voltage between +9 volts to +24 volts DC and provide at the output of the voltage regulator 92 a constant voltage which is applied to the high voltage power supply 96 in order to generate the necessary voltages for the image intensifier. Thus, the input filter can receive any voltage within the range of 9 to 24 volts DC and provide a constant output voltage for the voltage regulator which again in turn supplies a constant output voltage to enable operation of the high voltage supply. In this manner, most television cameras which operate with an internal battery or DC source between 9 to 24 volts DC can be operated by the circuit shown.

Figure 4B:
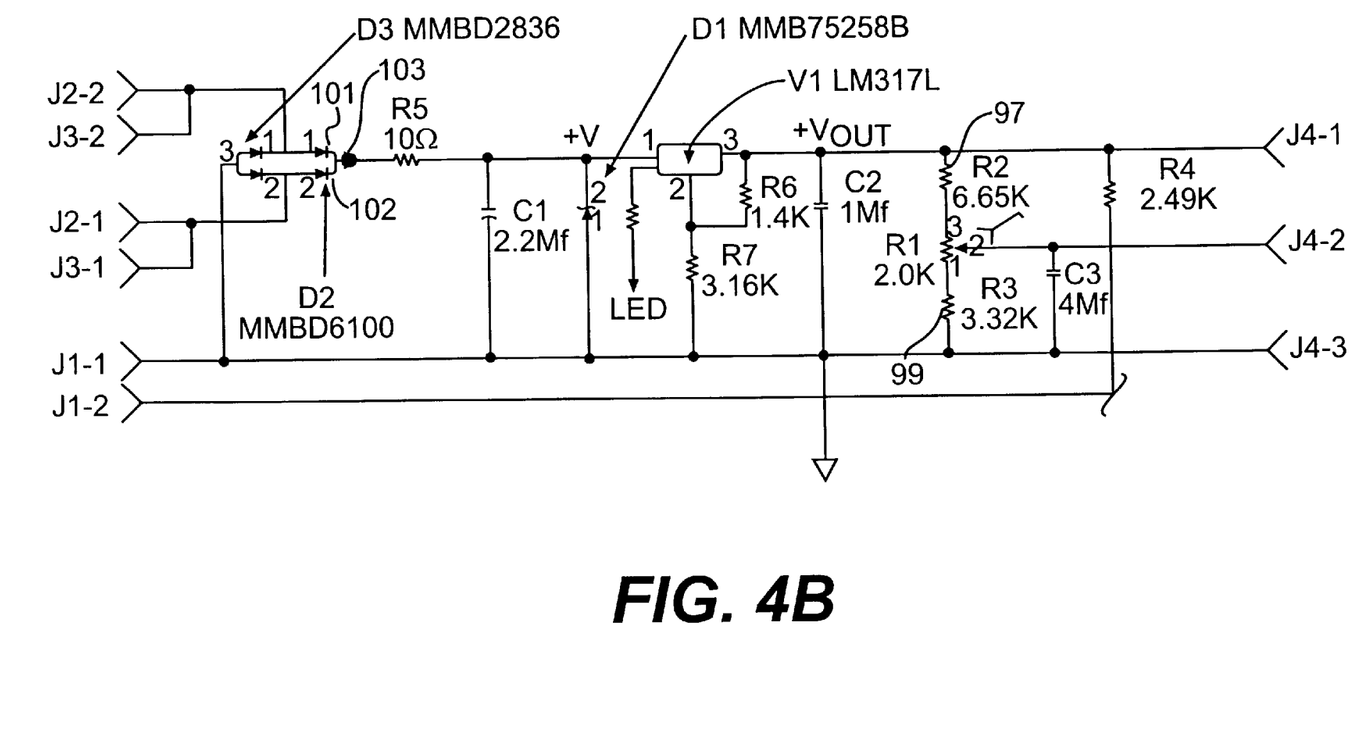
FIG. 4B is an actual circuit schematic depicting the circuitry for the components of the block diagram of FIG. 4A.

Referring to FIG. 4B, there is shown an actual circuit schematic depicting the circuitry for the input filter 94 and the voltage regulator 92 of FIG. 4A. As can be seen, the jacks as depicted on FIG. 4A receive the same numerical designations as J2-2, J3-2, and so on. The input from the television camera is applied between jacks J2-2 and J2-1 or J3-2 and J3-1. The input jacks J2-2, J3-2, J2-1, J3-1 are directed to a diode quad which consists of four diodes. Upon the application of a positive voltage to terminal J2-2 with a negative voltage to terminal J2-1 diode 101 is operated to pass current. If a positive voltage is applied to terminal J2-1 with a negative voltage to J2-2 then diode 102 is biased in a forward direction and hence the camera battery voltage appears at the terminal 103. Terminal 103 is coupled through a resistor R1 to reference potential through capacitor C1. Coupled across capacitor C1 is a Zener diode which has its cathode coupled to the terminal between R1 and C1 and the anode coupled to the point of reference potential. This Zener diode produces a constant voltage +V at the output. This voltage is applied to terminal 1 of a standard voltage regulator integrated circuit designated as U1 and is an LM317L. This voltage regulator is available from many sources, as for example, National Semiconductor, Motorola and so on.

The output of the voltage regulator Vout is then directed to a capacitor C2 which is a large value tending to hold the output voltage constant. The output voltage is impressed across the resistive divider as shown in FIG. 4A consisting of resistors 97, potentiometer 98, and resistor 99. The values of the components are given in the schematic. The arm of the potentiometer is coupled to terminal 2 of the high voltage supply. Essentially, the high voltage supply, as indicated above, operates to produce high voltages from a regulated DC voltage which is applied at the output terminal and designated as Vout and coupled to J4-1. The remaining voltages that appear on terminals J4-2 and J4-3 are reference potentials and are used in the high voltage supply. Essentially, the control circuit shown in FIG. 4B operates to receive a DC voltage between 9 and 24 volts and produces a constant output voltage Vout which is applied to the input of a high voltage power supply and used to generate the high voltages for the anode, photocathode, and microchannel plate of the image intensifier. Thus, any television camera which operates from a DC voltage between 9 to 24 volts can utilize the image intensifier module as described above and an output from the voltage regulator can be used to apply bias to an LED for illuminating an area to be viewed by the TV camera.

It should be understood that the embodiment described herein is merely exemplary and that a person skilled in the art may make many variations and modifications to the embodiment utilizing functionally equivalent elements to those described herein. Any and all such variations or modifications as well as others which may become apparent to those skilled in the art, are intended to be included within the scope of the invention as defined by the appended claims.

What is claimed is:

1. A camera assembly having night vision capabilities, having a front end including image forming means, and a camera body, comprising:

a camera device having a first lens mount aperture capable of accommodating an objective lens assembly, said camera body being rearward of said first lens mount aperture and including an externally located power jack, and a modular night vision device including:

an image intensifier module for intensifying light images, said image intensifier module encased in a first housing removably coupled to said first lens mount aperture, said housing having a second lens mount aperture at the input end of the image intensifier module, said objective lens assembly of said camera device removably coupled to said second lens mount aperture;

a power supply control module for receiving a D.C. voltage produced by the camera device which falls within a predetermined range of D.C. voltages and converting the voltage into a plurality of operating voltages which are usable to power said image intensifier module, said power supply control module encased in a second housing removably coupled to an exterior surface of said camera body and electrically coupled to said externally located power jack; and a cable electrically coupling said image intensifier module with said power supply control module, said cable for transmitting said operating voltages from said power supply control module to said image intensifier module.

2. The camera assembly of claimed 1 further comprising, high voltage supply means for generating said operating voltages;

input filter means for receiving said range of DC voltages;

voltage regulator means coupled between said input filter means and said high voltage supply means for producing a constant output voltage, in response to said any DC voltage within said range of DC voltages received by said input filter means, which is applied to said high voltage supply means, thereby causing said high voltage supply means to generate said operating voltages.

* * * * *